US011736510B2

(12) United States Patent
Chen et al.

(10) Patent No.: US 11,736,510 B2
(45) Date of Patent: Aug. 22, 2023

(54) DOMAIN SECURITY ASSURANCE AUTOMATION

(71) Applicant: Disney Enterprises, Inc., Burbank, CA (US)

(72) Inventors: Wen Tung Chen, Pasadena, CA (US); Preetjot Singh, Laguna Hills, CA (US); Christine Tang, San Diego, CA (US)

(73) Assignee: Disney Enterprises, Inc., Burbank, CA (US)

( * ) Notice: Subject to any disclaimer, the term of this patent is extended or adjusted under 35 U.S.C. 154(b) by 262 days.

(21) Appl. No.: 17/386,378

(22) Filed: Jul. 27, 2021

(65) Prior Publication Data

US 2023/0034954 A1 Feb. 2, 2023

(51) Int. Cl.
*H04L 9/40* (2022.01)

(52) U.S. Cl.
CPC .......... *H04L 63/1433* (2013.01); *H04L 63/20* (2013.01); *H04L 63/02* (2013.01)

(58) Field of Classification Search
CPC ...... H04L 63/1433; H04L 63/20; H04L 63/02
USPC .............................. 726/1, 22, 23, 24 and, 25
See application file for complete search history.

(56) References Cited

U.S. PATENT DOCUMENTS

| | | | | |
|---|---|---|---|---|
| 8,799,465 B2* | 8/2014 | Lake | ....................... | H04L 61/00 709/225 |
| 2006/0075491 A1* | 4/2006 | Lyon | ................... | H04L 65/1101 726/22 |
| 2007/0067845 A1* | 3/2007 | Wiemer | .............. | H04L 63/1433 726/25 |
| 2009/0254970 A1* | 10/2009 | Agarwal | ............... | G06F 21/554 726/1 |
| 2012/0284791 A1* | 11/2012 | Miller | ................... | G06F 21/554 726/22 |

* cited by examiner

*Primary Examiner* — Teshome Hailu
(74) *Attorney, Agent, or Firm* — Farjami & Farjami LLP

(57) ABSTRACT

A domain security assurance system includes a computing platform having processing hardware and a memory storing software code. The processing hardware is configured to execute the software code to obtain domain inventory data identifying multiple domains, to predict, using the domain inventory data, which of the domains are owned by the same entity to identify commonly owned domains, and to determine, using the domain inventory data and the commonly owned domains, which of the commonly owned domains are controlled by the same administrator to identify one or more group(s) of commonly administered domains. When executed, the software code also removes, using the domain inventory data, duplicate domains included in the group(s) to identify non-duplicate domains, evaluates a susceptibility of each of the non-duplicate domains to a cyber-attack to identify one or more target domain(s) vulnerable to the cyber-attack, and identifies the target domain(s) for a security assessment.

20 Claims, 3 Drawing Sheets

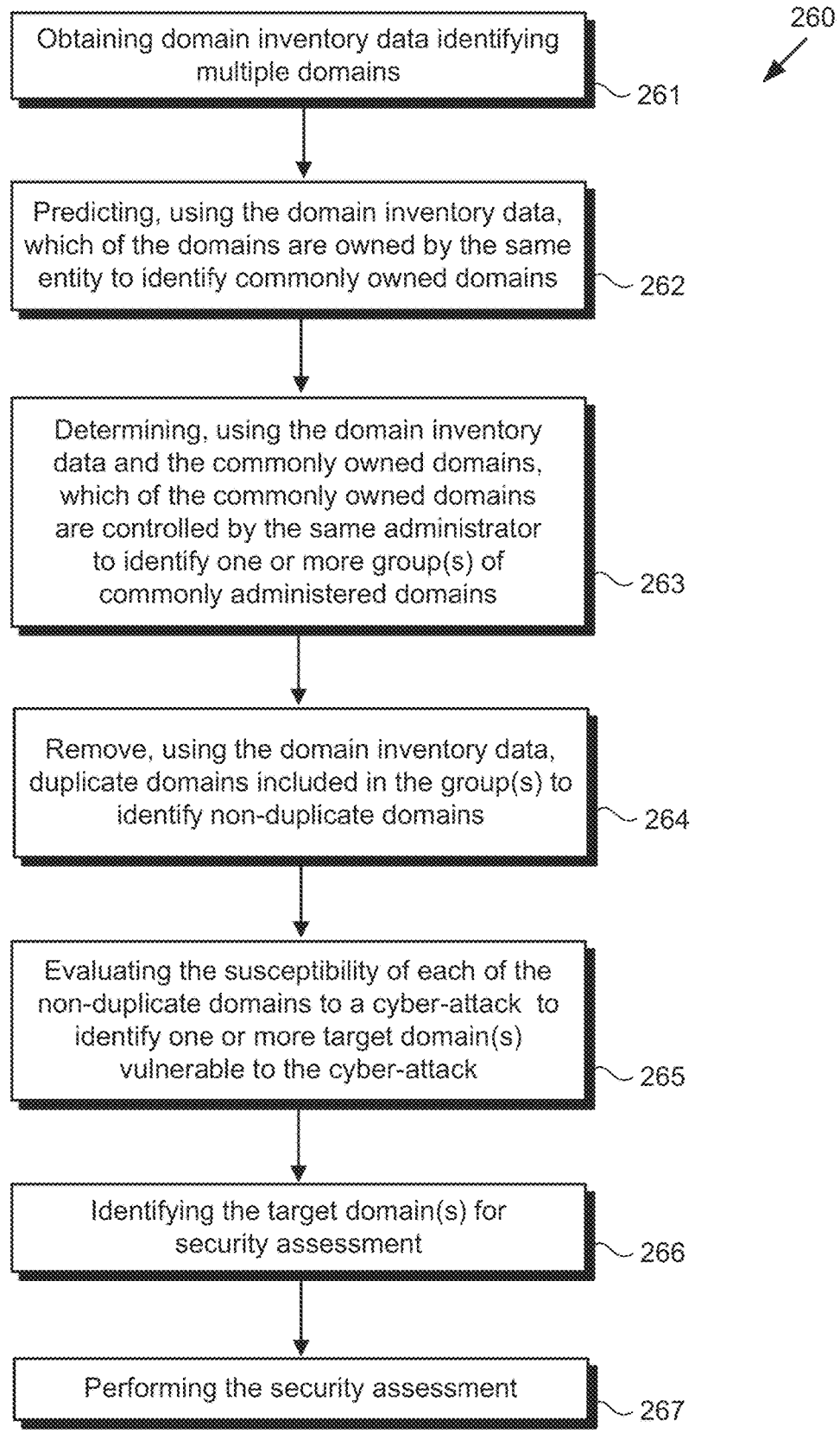

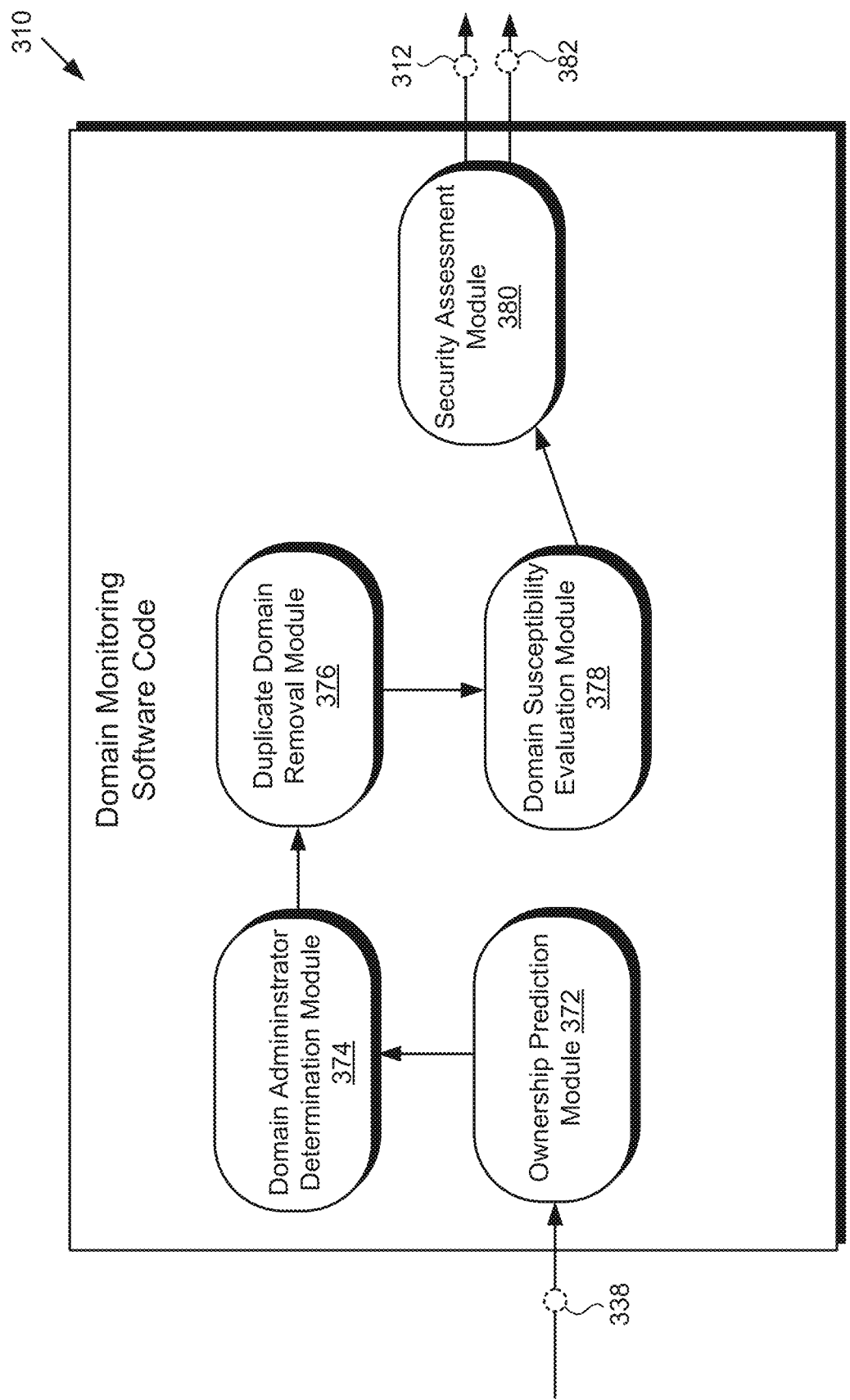

DOMAIN SECURITY ASSURANCE AUTOMATION

BACKGROUND

A large organization, such as a government entity or an affiliation of corporate subsidiaries, for example, may establish and support thousands of domains accessible by consumers or other users. In such an environment, the efficient identification of commonly owned or administered domains can be important for effective deployment of resources for assessing and mitigating security vulnerabilities of those domains.

Conventional solutions for identifying domains that are commonly owned or administered typically include costly and labor intensive manual investigation by human contributors. Consequently, conventional solutions may take many months to complete for a large organization and may nevertheless fail to identify some domains owned or administered by the organization. Thus, there is a need in the art for an automated solution for efficiently and inexpensively identifying and assessing the security vulnerabilities of commonly owned or administered domains.

BRIEF DESCRIPTION OF THE DRAWINGS

FIG. 2 shows a flowchart presenting an exemplary method for performing automated domain security assurance, according to one implementation; and FIG. 3 shows an exemplary diagram of a domain monitoring software code suitable for execution by a processing hardware of the system shown by FIG. 1, according to one implementation.

DETAILED DESCRIPTION

Figure 1:
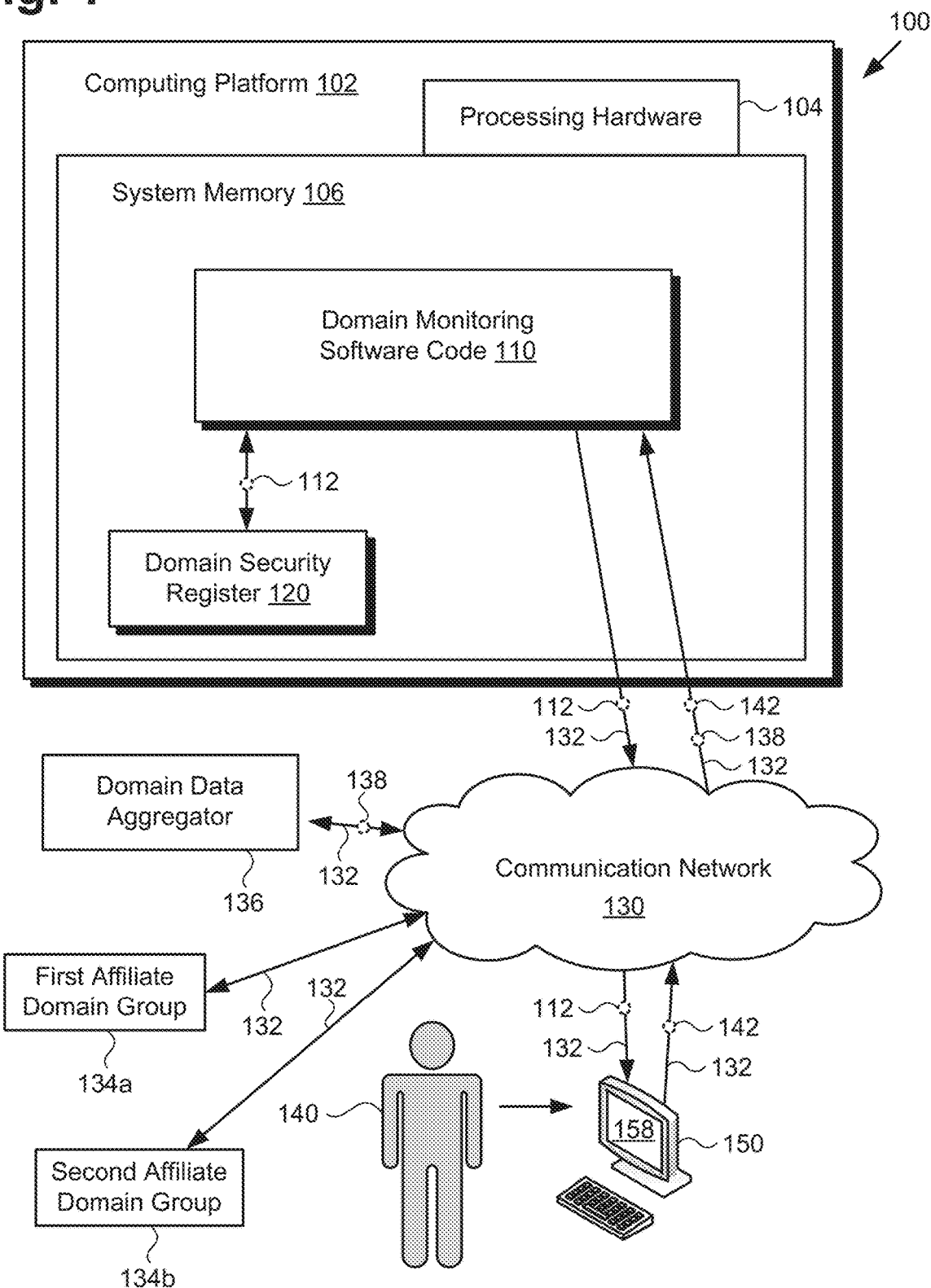
FIG. 1 shows a diagram of an exemplary automated domain security assurance system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a domain security assurance solution that overcomes the drawbacks and deficiencies in the conventional art. The present domain security assurance solution is an automated solution that identifies commonly owned or administered domains and assesses their security vulnerabilities to cyber-attack. It is noted that, as used in the present application, the terms "automation," "automated," and "automating" refer to systems and processes that do not require the participation of a human administrator. Although in some implementations the vulnerability evaluations or security assessments performed by the systems and methods disclosed herein may be reviewed or even modified by a human system administrator, that human involvement is optional. Thus, the methods described in the present application may be performed under the control of hardware processing components of the disclosed systems.

FIG. 1 shows a diagram of an exemplary automated domain security assurance system, according to one implementation. As shown in FIG. 1, domain security assurance system 100 includes computing platform 102 having processing hardware 104, and system memory 106 implemented as a computer-readable non-transitory storage medium. According to the present exemplary implementation, system memory 106 stores domain monitoring software code 110 and domain security register 120.

As further shown in FIG. 1, domain security assurance system 100 is implemented within a use environment including communication network 130 having network communication links 132, first affiliate domain group 134a, second affiliate domain group 134b, and domain data aggregator 136, as well as user system 150 including display 158. Also shown in FIG. 1 are user 140 of user system 150, domain inventory data 138, security evaluation request 142, and security report 112 for the domains included in first and second affiliate domain groups 134a and 134b, produced using domain monitoring software code 110.

Each of first and second affiliate domain groups 134a and 134b include multiple domains under the control of the same respective administrator. That is to say first affiliate domain group 134a includes multiple domains controlled by a first administrator, while second affiliate domain group 134b includes multiple domains controlled by a second administrator. First and second affiliate domain groups 134a and 134b may be "affiliated" by virtue of being commonly owned by a parent entity. It is noted that although FIG. 1 shows two affiliate domain groups, that representation is provided merely in the interests of conceptual clarity. More generally, domain security assurance system 100 may be implemented in a use environment including one affiliate domain group, hundreds of affiliate domain groups, or thousands of affiliate domain groups that collectively include thousands, tens of thousands, or hundreds of thousands of individual domains.

Although the present application refers to domain monitoring software code 110 and domain security register 120 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to processing hardware 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts domain monitoring software code 110 and domain security register 120 as being co-located in system memory 106, that representation is also merely provided as an aid to conceptual clarity. More generally, domain security assurance system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within domain security assurance system 100, while domain monitoring software code 110 and domain security register 120 may be stored remotely from one another in the distributed memory resources of domain security assurance system 100.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platforms 102, as well as a Control Unit (CU) for retrieving programs, such as domain monitoring software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

It is noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, domain security assurance system 100 may be implemented virtually, such as in a data center. For example, in some implementations, domain security assurance system 100 may be implemented in software, or as virtual machines.

User 140, who may be a security officer for the common owner of the domains included in first and second affiliate domain groups 134a and 134b, for example, may utilize user system 150 to interact with domain security assurance system 100. In some implementations, for example, user 140 may utilize user system 150 to provide security evaluation request 142 and to receive and review security report 112.

Although user system 150 is shown as a desktop computer in FIG. 1, that representation is provided merely as an example. More generally, user system 150 may be any suitable mobile or stationary computing device or system that implements data processing capabilities sufficient to provide a user interface, support connections to communication network 130, and implement the functionality ascribed to user system 150 herein. For example, in some implementations, user system 150 may take the form of a laptop computer, tablet computer, or smartphone, for example. However, in other implementations user system 150 may be a "dumb terminal" peripheral component of domain security assurance system 100 that enables user 140 to provide inputs via a keyboard or other input device, as well as to security report 112 on display 158. In those implementations, user system 150 and display 158 may be controlled by processing hardware 104 of domain security assurance system 100.

With respect to display 158 of user system 150, display 158 may be physically integrated with user system 150 or may be communicatively coupled to but physically separate from user system 150. For example, where user system 150 is implemented as a smartphone, laptop computer, or tablet computer, display 158 will typically be integrated with user system 150. By contrast, where user system 150 is implemented as a desktop computer, display 158 may take the form of a monitor separate from user system 150 in the form of a computer tower. Moreover, display 158 may be implemented as a liquid crystal display (LCD), light-emitting diode (LED) display, organic light-emitting diode (OLED) display, quantum dot (QD) display, or any other suitable display screen that performs a physical transformation of signals to light.

It is noted that, in various implementations, security report 112 for domains included in first and second affiliate domain groups 134a and 134b, when generated using domain monitoring software code 110, may be stored in domain security register 120, may be copied to non-volatile storage (not shown in FIG. 1), or may be both stored in domain security register 120 and copied to non-volatile storage. Alternatively, or in addition, as shown in FIG. 1, in some implementations, security report 112 may be transmitted to user system 150 for display to user 140. It is further noted that security report 112 may include a uniform resource identifier (URI) of some or all of the domains included in first and second affiliate domain groups 134a and 134b, as well as the susceptibility of each of those domains to cyber-attack. Alternatively, or in addition, security report 112 may include identification of a target domain or target domains among the domains included in first and second affiliate domain groups 134a and 134b that are vulnerable to cyber-attack, for security assessment. As another alternative, or in addition to some or all of the features described above, security report 112 may include the results of security assessments performed on target domains identified as being vulnerable to cyber-attack.

The functionality of domain monitoring software code 110 will be further described by reference to FIG. 2 in combination with FIGS. 1 and 3. FIG. 2 shows flowchart 260 presenting an exemplary method for use by a system, such as domain security assurance system 100, in FIG. 1, for performing automated domain security assurance. With respect to the method outlined in FIG. 2, it is noted that certain details and features have been left out of flowchart 260 in order not to obscure the discussion of the inventive features in the present application.

FIG. 3 shows exemplary domain monitoring software code 310 suitable for execution by processing hardware 104 of domain security assurance system 100, in FIG. 1, according to one implementation. As shown FIG. 3, domain monitoring software code 310 may include ownership prediction module 372, domain administrator determination module 374, duplicate domain removal module 376, domain susceptibility evaluation module 378, and security assessment module 380. Also shown in FIG. 3 are domain inventory data 338, security report 312, and security assessment request 382.

Domain inventory data 338 and security report 312 correspond respectively in general to domain inventory data 138 and security report 112, in FIG. 1. Consequently, domain inventory data 338 and security report 312 may share any of the characteristics attributed to respective domain inventory data 138 and security report 112 by the present disclosure, and vice versa. Moreover, domain monitoring software code 310 corresponds in general to domain monitoring software code 110, in FIG. 1, and those corresponding features may share any of the characteristics attributed to either corresponding feature by the present disclosure. Thus, like domain monitoring software code 310, domain monitoring software code 110 may include modules corresponding to ownership prediction module 372, domain administrator determination module 374, duplicate domain removal module 376, domain susceptibility evaluation module 378, and security assessment module 380.

Referring now to FIG. 2 in combination with FIGS. 1 and 3, flowchart 260 begins with obtaining domain inventory data 138/338 identifying multiple domains (action 261). As shown in FIG. 1, in some implementations, domain inventory data 138/338 may be obtained from domain data aggregator 136, which may be a third party vendor of data aggregation services, for example. Domain inventory data 138/338 may include data identifying and describing substantially all domains accessible via communication network 130. That is to say, domain inventory data 138/338 may include data identifying and describing not only the domains included in one or more affiliate domain groups (e.g., first and second affiliate domain groups 134a and 134b), but all other domains accessible via communication network 130, including unaffiliated domains not owned by the common owner of the domains included in first and second affiliate domain groups 134a and 134b. For example, domain inventory data 138/338 may identify and describe more than one million domains, only a subset of which are commonly owned by the owner of the domains included in first and second affiliate domain groups 134a and 134b.

Domain inventory data 138/338 may be obtained in action 261 by domain monitoring software code 110/310, executed by processing hardware 104 of computing platform 102. Domain inventory data 138/338 may be obtained from domain data aggregator 136 via communication network 130 and network communication links 132. In some implementations, domain inventory data 138/338 may be obtained by domain monitoring software code 110/310 through an automated application programming interface (API) with domain data aggregator 136. In some use cases, processing hardware 104 may execute domain monitoring software code 110/310 to perform action 261 in response to receiving security evaluation request 142 from user system 150. However, in other use cases, domain monitoring software code 110/310 may be configured to perform 261 sua sponte, or periodically, on a predetermined schedule, for example.

Flowchart 260 may continue with predicting, using domain inventory data 138/338, which of the multiple domains identified by domain inventory data 138/338 are owned by the same entity having ownership of the domains included in first and second affiliate domain groups 134a and 134b to identify multiple commonly owned domains (action 262). Action 262 may be performed by domain monitoring software code 110/310, executed by processing hardware 104 of computing platform 102, and using ownership prediction model 372.

Identification of commonly owned domains in action 262 is important to ensure that domain security assurance system 100 will not inadvertently perform security assessment against a domain not owned by the owner of the domains included in first and second affiliate domain groups 134a and 134b because such an action could be interpreted as malicious by the rightful owner of such a domain. As part of action 262, a false positive analysis may be performed. To determine whether a particular domain is commonly owned by the owner of the domains included in first and second affiliate domain groups 134a and 134b (hereinafter "owner"), certain attributes of the domain are identified and compared to those known to belong to the owner (e.g., a domain registered using an email address of the owner, hosting by the domain of a server belonging to the owner, the presence of the owner's copyright on the domain website, and the like).

Processing hardware 104 may execute domain monitoring software code 110/310 to use ownership prediction module 372 to predict which of the domains identified by domain inventory data 138/338 are owned by the same entity by applying one or more predetermined rules to domain inventory data 138/338. Those rules may be applied to automatically determine whether a domain is a domain owned by the owner, a non-owner owned domain—in which case the domain may be disregarded, or a candidate domain, i.e., ownership to be determined pending the application of additional rules. Examples of rules that may be applied as part of action 262 include whether the domain has a legal link to the owner, whether the domain uses a WhoIs™ email of the owner, whether the domain is using an Autonomous System Number (ASN) of the owner, and whether the domain is using a Data Source Name (DSN) of the owner, to name a few.

It is noted that in some implementations, a human user of domain security assurance system 100 may periodically review the results of action 262 and may update the rules applied in action 262 to improve the performance of domain security assurance system 100. For example, the candidate domains identified above that are neither identified as owner owned nor disregarded as non-owner owned may be manually analyzed by a human user of domain security assurance system 100. Such human manual analysis may lead to the identification of additional rules that can automatically be applied as part of action 262 in the future.

Flowchart 260 also includes determining, using domain inventory data 138/338 and the commonly owned domains identified in action 262, which of those commonly owned domains are controlled by the same administrator to identify one or more groups of commonly administered domains, e.g., first and second affiliate domain groups 134a and 134b (action 263). As shown in FIGS. 1 and 3, in one implementation, domain monitoring software code 110/310, executed by processing hardware 104 of computing platform 102, may utilize domain administrator determination module 374 to identify first and second affiliate domain groups 134a and 134b.

Using the reduced list of domains identified as commonly owned in action 262, the business unit subsidiary of the business entity owner, or the department or agency of the governmental entity owner that administers each domain may be determined using machine learning and modeling, as those features are described above. Each domain identified as commonly owned by the owner may be examined for identifiers such as the topic of the domain website content, technical attributes, server, location, domain name, and subdomain name, to name a few examples. Technical attributes may include whether a domain website is built with PHP or particular libraries of JavaScript, for instance. Additional machine learning models may be used to analyze metadata, naming conventions of websites, and content keywords. It is noted that action 263 may be performed using technical attributes alone, one or more of the identifiers exclusive of the technical attributes, or the technical attributes in combination with any one or more other identifiers. It is further noted that the results of action 263 may be periodically reviewed by a human user of domain security assurance system 100, and the results of those reviews can be used to retrain any of the machine learning models of domain monitoring software code 110/310.

Flowchart 260 also includes removing, using domain inventory data 138/338, duplicate domains included in first and second affiliate domain groups 134*a* and 134*b* to identify non-duplicate domains (action 264). Identification of the non-duplicate domains in action 264 may be performed by domain monitoring software code 110/310, executed by processing hardware 104, and using duplicate domain removal module 376.

It is noted that modern content management systems allow web application managers to deploy multiple domains each having websites that appear to be different but are supported by the same application. These domains are considered duplicates in the security assessment context because by being supported by the same application, their risk profiles and security postures are typically similar or substantially the same. Thus, assessing duplicate domains results in testing the same application multiple times, and this undesirably reduces the efficiency and increases the cost of performing a security assessment.

Processing hardware 104 may be configured to execute domain monitoring software code 110/310 to enrich domain inventory data 138/338 using deduplication data modeling to predict which domains are duplicate. In some implementations, for example, clustering is used to group domains based on a particular parameter. By grouping similar domains, the applications supporting multiple duplicate domains can be identified. In general, action 264 may include first collecting all possible domain signatures from each domain. It is noted that, as used in the present application, the features "domain signatures" refer to programming data structures or mathematical objects that have a distilled, comparable representation of the input data, such as domain website content (e.g., HTML content) and various metadata (e.g., the technical attributes described above). These domain signatures may be automatically generated either by specially authored script or by an open source or commercial profiling tool. Domain signatures are compared because websites with similar domain signatures tend to be similar, while those having dissimilar domain signatures tend to be dissimilar.

Action 264 may further include forming clusters of domains by examining domain attributes such as metadata, business unit administration, whether one domain uses using a server-side scripting language such as PHP or a client-side scripting language such as JavaScript, and Internet Protocol (IP) address (e.g., hosting on Amazon® vs hosting on Google®), to name a few examples. Each cluster may represent the same support application but different URIs, such as different uniform resource locators (URLs), or may share a similar profile such that only one of the duplicate domains needs to have its security assessed.

With respect to actions 263 and 264 described above, it is noted that although to flowchart 260 shows action 263 as preceding action 264, that representation is merely by way of example. In some implementations, actions 263 and 264 may be performed in parallel, i.e., substantially concurrently, while in other implementations, action 264 may precede action 263. It is further noted that after completion of actions 263 and 264, the number of non-duplicate domains having common ownership may number in the few thousands, such as three thousand or four thousand, for example, rather than the more than one million domains identified by domain inventory data 138/338.

Flowchart 260 also includes evaluating the susceptibility of each of the non-duplicate domains to a cyber-attack to identify one or more target domains vulnerable to the cyber-attack (action 265). Identification of a non-duplicate domain as a target domain vulnerable to cyber-attack may be performed by domain monitoring software code 110/310, executed by processing hardware 104 of computing platform 102, and using domain susceptibility evaluation module 378.

Processing hardware 104 may execute domain monitoring software code 110/310 to examine each non-duplicate domain for its current risk profile. For example, if a non-duplicate domain has a low attack surface or robust defensive mechanisms it is typically less likely to have a critical vulnerability and may be disregarded in order to focus the available security assessment resources on domains having a higher likelihood of being compromised. Action 265 seeks to programmatically include a cyber criminal's instincts into the target domain identification process. For example, a hacker may tend to avoid a domain protected by a firewall known in the art to be robust against intrusion, such as firewalls provided by the web applications Cloudflare®, Akamai®, or Tarpit, to name a few. Other factors to be considered can include whether the non-duplicate domain host is alive, whether the non-duplicate domain is redirecting to somewhere else, what is the error code and generic message that the non-duplicate domain responds to, and whether the non-duplicate domain is approved to assess.

Alternatively, or in addition, factors to be considered when evaluating the susceptibility of a non-duplicate domain to a cyber-attack may include one or more of whether metadata or the signature of the non-duplicate domain has changed, whether the non-duplicate domain receives a significant amount of web content, the amount of content available on the non-duplicate domain, whether the non-duplicate domain has interactive components (e.g., form posts or URI parameters), and whether the non-duplicate domain requires authentication. Thus, in various implementations, the susceptibility of a non-duplicate domain to a cyber-attack may be evaluated based on one or more of the amount of content available on the non-duplicate domain, whether and how much of that content is interactive content, and the firewall quality of the non-duplicate domain.

It is noted that firewall quality may be evaluated based on whether the firewall is provided by a known and respected web application, as discussed above, or based on a manual analysis of a particular firewall performed by a cyber security professional. It is further noted that in determining susceptibility of a non-duplicate domain to a cyber-attack based on the amount of content/interactive content available on the non-duplicate domain, that content/interactive content may be compared to predetermined content/interactive content thresholds determined to be indicative of susceptibility to cyber-attack. In some implementations, action 265 may include recording, in domain security register 120, the URI of each of the non-duplicate domains identified in action 264, as well as the susceptibility of to each of those non-duplicate domains to cyber-attack.

In some implementations, the factors considered when evaluating the susceptibility of a non-duplicate domain to a cyber-attack and described above may be evaluated on a pass/fail basis. In those implementations, a failing grade applied to a predetermined number of factors, or to a threshold percentage of the factors, for example, may result in a particular domain being identified as a target domain. However, in other implementations, one or more of the factors described above may be deemed to be more probative of cyber-attack susceptibility than others. In these latter implementations, the one or more factors deemed more probative may be weighted accordingly.

With respect to actions 263, 264, and 265 described above, it is noted that although flowchart 260 shows actions 263 and 264 as preceding action 265, that representation is merely by way of example. For example, in some implementations action 265 may be performed on each commonly owned domain identified in action 262. Thus, in various implementations, actions 263, 264, and 265 may be performed in parallel, i.e., substantially concurrently, while in other implementations, action 265 may precede either or both of actions 263 and 264. It is further noted that after completion of actions 263, 264, and 265, the number of identified target domains may include one or two thousand domains, for example, rather than the more than one million domains identified by domain inventory data 138/338.

Flowchart 260 also includes identifying the one or more target domains for security assessment (action 266). In some use cases, identifying the one or more target domains for security assessment in action 266 may include transmitting security report 112/312 identifying the one or more target domains to user system 150 for review by user 140. Alternatively, or in addition, action 266 may include transmitting security assessment request 382 to a third party security assessment service identifying the one or more target domains for assessment. For example, security assessment request 382 may request that the third party security assessment service mount a cyber-attack on the one or more target domains in order to assess their present vulnerabilities and to identify mitigating strategies for reducing or eliminating those vulnerabilities. It is noted that, a cyber-attack may include various techniques to identify configuration weaknesses, technical flaws, or known vulnerabilities and to actively exploit them. Types of vulnerability tests performed during a cyber-attack may include, but are not limited to, injection attacks, sensitive data exposure, XML external entity attacks, security misconfiguration, cross site scripting, insecure deserialization, and use of known vulnerable components and broken authentications, as known in the art. Action 266 may be performed by domain monitoring software code 110/310, executed by processing hardware 104 of computing platform 102, and using security assessment module 380.

In some implementations flowchart 260 may conclude with action 266 described above. However, in other implementations, flowchart 260 may further include performing the security assessment of the one or more target domains faction 267). Action 267 may be performed by domain g software code 110/310, executed by processing hardware 104, and using security assessment module 380. For example, processing hardware 104 may execute domain monitoring software code 110/310 to use security assessment module 380 to mount a cyber-attack on the one or more target domains identified for security assessment in action 266.

In some implementations, action 266 or action 267 may include adjusting, using the result of the security assessment performed on a target domain, one or more cyber security parameters of the target domain, such as its firewall quality, or authentication requirements, to for example. Alternatively, or in addition, in some implementations, action 266 or action 267 may include updating domain security register 120 using the result of the security assessment. With respect to the method outlined by flowchart 260, it is emphasized that, in some implementations, actions 261 through 266, or actions 261 through 267, may be performed in an automated process from which human involvement may be omitted.

Thus, the present application discloses an automated domain security assurance solution that addresses and overcomes the deficiencies in the conventional art. The novel and inventive concepts disclosed by the present application advantageously enable the efficient and inexpensive identification of commonly owned or administered domains, as well as assessment of the security vulnerabilities of those domains to cyber-attack. As a result, an inventory and security assessment process requiring months for completion using conventional techniques can be completed in less than one eek using the solution disclosed in the present application. Moreover, because the present solution may be fully automated, it is not prone to human errors and omissions, and thus provides results not only far more quickly than is possible using conventional techniques, but results that are also more accurate.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A domain security assurance system comprising:
   a computing platform having a processing hardware and a system memory storing a software code;
   the processing hardware configured to execute the software code to:
     obtain domain inventory data identifying a plurality of domains;
     predict, using the domain inventory data, which of the plurality of domains are owned by a same entity to identify a plurality of commonly owned domains;
     determine, using the domain inventory data and the plurality of commonly owned domains, which of the plurality of commonly owned domains are controlled by a same administrator to identify one or more groups of commonly administered domains;
     remove, using the domain inventory data, duplicate domains included in the one or more groups of commonly administered domains to identify a plurality of non-duplicate domains;

evaluate a susceptibility of each of the plurality of non-duplicate domains to a cyber-attack to identify at least one target domain vulnerable to the cyber-attack; and identify the at least one target domain for a security assessment;

wherein the susceptibility of one of the plurality of non-duplicate domains to the cyber-attack is evaluated based on at least one of (i) an amount of content available on the one of the plurality of non-duplicate domains, (ii) an amount of interactive content available on the one of the plurality of non-duplicate domains, or (iii) a firewall quality of the one of the plurality of non-duplicate domains.

2. The domain security assurance system of claim 1, wherein the security assessment comprises the cyber-attack on the at least one target domain.

3. The domain security assurance system of claim 1, wherein the processing hardware is further configured to execute the software code to:

adjust, using a result of the security assessment, at least one cyber security parameter of the at least one target domain.

4. The domain security assurance system of claim 1, wherein the processing hardware is further configured to execute the software code to perform the security assessment of the at least one target domain.

5. The domain security assurance system of claim 1, wherein predicting which of the plurality of domains are owned by the same entity comprises applying a plurality of predetermined rules to the domain inventory data.

6. The domain security assurance system of claim 1, wherein the susceptibility of the one of the plurality of non-duplicate domains to the cyber-attack is evaluated based on the amount of the interactive content available on the one of the plurality of non-duplicate domains.

7. The domain security assurance system of claim 1, wherein the susceptibility of the one of the plurality of non-duplicate domains to the cyber-attack is evaluated based on the amount of the content available on the one of the plurality of non-duplicate domains and the firewall quality of the one of the plurality of non-duplicate domains.

8. The domain security assurance system of claim 1, wherein the domain inventory data is obtained through an automated application programming interface (API) with a domain data aggregator.

9. The domain security assurance system of claim 1, further comprising a domain security register, wherein the processing hardware is further configured to execute the software code to:

record, in the domain security register, a uniform resource identifier (URI) of each of the plurality of non-duplicate domains and the susceptibility of each of the plurality of non-duplicate domains to the cyber-attack.

10. The domain security assurance system of claim 9, wherein after the security assessment of the at least one target domain is performed, the processing hardware is further configured to:

update the domain security register using a result of the security assessment.

11. A method for use by a domain security assurance system including a computing platform having a processing hardware and a system memory storing a software code, the method comprising:

obtaining, by the software code executed by the processing hardware, domain inventory data identifying a plurality of domains;

predicting, by the software code executed by the processing hardware and using the domain inventory data, which of the plurality of domains are owned by a same entity to identify a plurality of commonly owned domains;

determining, by the software code executed by the processing hardware and using the domain inventory data and the plurality of commonly owned domains, which of the plurality of commonly owned domains are controlled by a same administrator to identify one or more groups of commonly administered domains;

removing, by the software code executed by the processing hardware and using the domain inventory data, duplicate domains included in the one or more groups of commonly administered domains to identify a plurality of non-duplicate domains;

evaluating, by the software code executed by the processing hardware, a susceptibility of each of the plurality of non-duplicate domains to a cyber-attack to identify at least one target domain vulnerable to the cyber-attack; and identifying, by the software code executed by the processing hardware, the at least one target domain for a security assessment;

wherein evaluating the susceptibility of one of the plurality of non-duplicate domains to the cyber-attack is based on at least one of (i) an amount of content available on the one of the plurality of non-duplicate domains, (ii) an amount of interactive content available on the one of the plurality of non-duplicate domains, or (iii) a firewall quality of the one of the plurality of non-duplicate domains.

12. The method of claim 11, wherein the security assessment comprises the cyber-attack on the at least one target domain.

13. The method of claim 11, further comprising:

adjusting, by the software code executed by the hardware processor and using a result of the security assessment, at least one cyber security parameter of the at least one target domain.

14. The method of claim 11, further comprising:

performing, by the software code executed by the processing hardware, the security assessment of the at least one target domain.

15. The method of claim 11, wherein predicting which of the plurality of domains are owned by the same entity comprises applying a plurality of predetermined rules to the domain inventory data.

16. The method of claim 11, wherein evaluating the susceptibility of the one of the plurality of non-duplicate domains to the cyber-attack is based on the amount of the interactive content available on the one of the plurality of non-duplicate domains.

17. The method of claim 11, wherein evaluating the susceptibility of the one of the plurality of non-duplicate domains to the cyber-attack is based on the amount of the content available on the one of the plurality of non-duplicate domains and the firewall quality of the one of the plurality of non-duplicate domains.

18. The method of claim 11, wherein the domain inventory data is obtained through an automated application programming interface (API) with a domain data aggregator.

19. The method of claim 11, wherein the domain security assurance system further comprising a domain security register, the method further comprising:

recording in the domain security register, by the software code executed by the processing hardware, a uniform resource identifier (URI) of each of the plurality of non-duplicate domains and the susceptibility of each of the plurality of non-duplicate domains to the cyber-attack.

20. The method of claim 19, wherein after the security assessment of the at least one target domain is performed, the method further comprises:

updating, by the software code executed by the processing hardware and using a result of the security assessment, the domain security register.

* * * * *